B. FORD.
VENTILATING STORAGE BATTERY CELLS.
APPLICATION FILED FEB. 8, 1918.
1,280,982.
Patented Oct. 8, 1918.
7 SHEETS—SHEET 1.
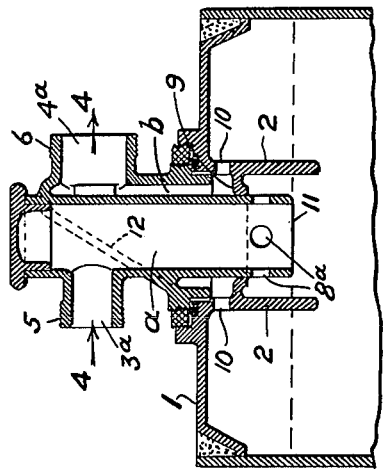
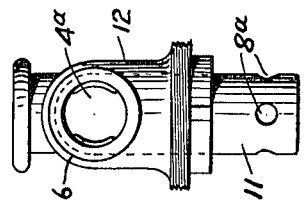
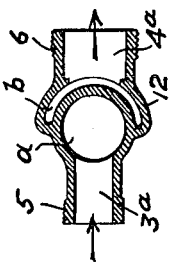
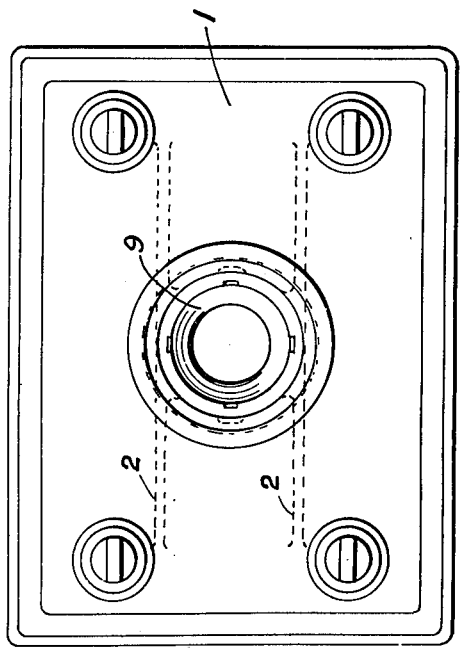
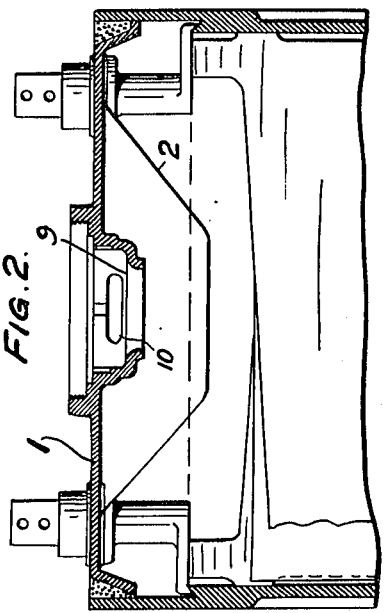
WITNESS:
INVENTOR
Bruce Ford
BY
ATTORNEY.

B. FORD.
VENTILATING STORAGE BATTERY CELLS.
APPLICATION FILED FEB. 8, 1918.

1,280,982.

Patented Oct. 8, 1918.
7 SHEETS—SHEET 2.

WITNESS:

INVENTOR
Bruce Ford
BY
ATTORNEY.

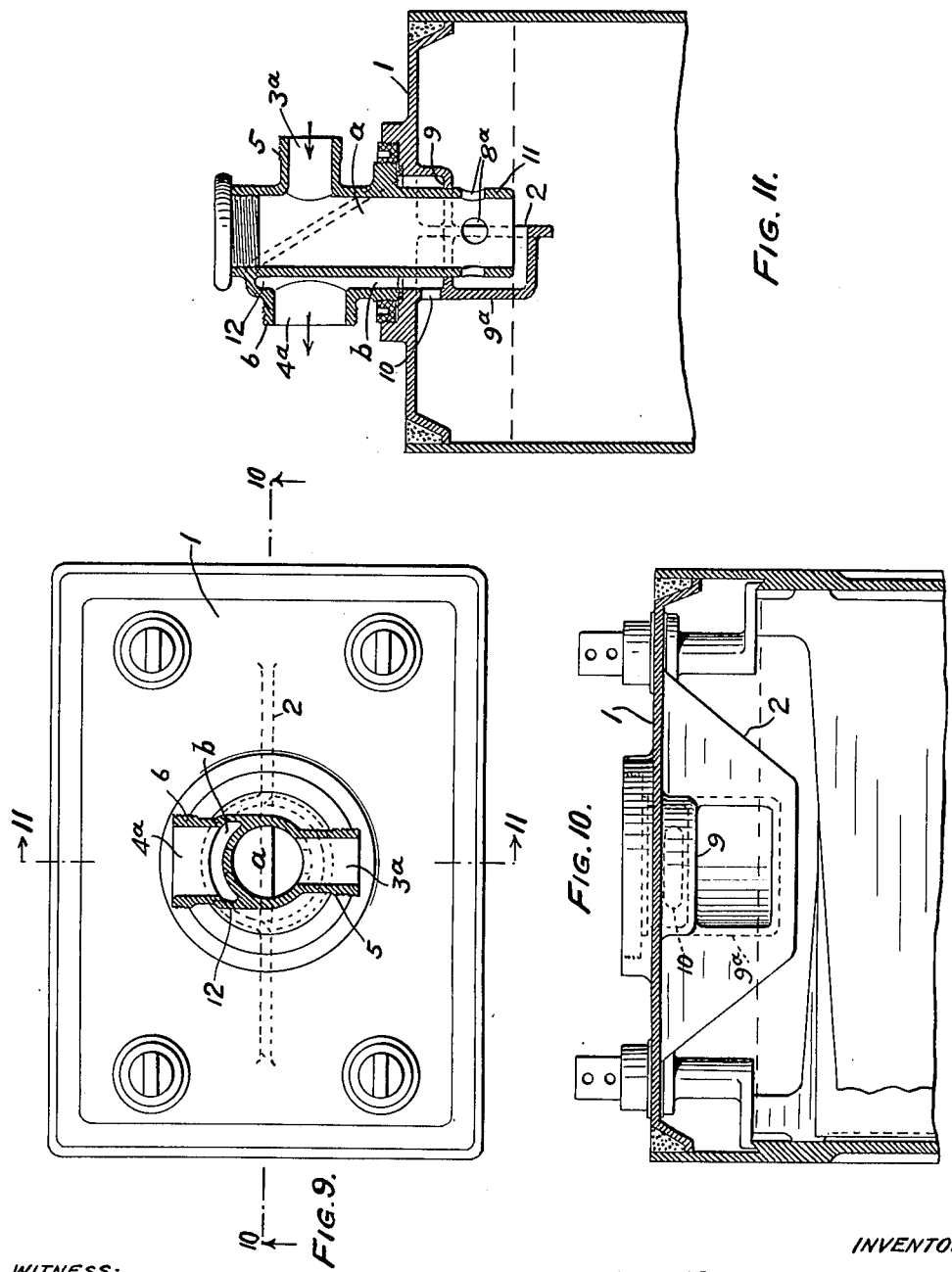

B. FORD.
VENTILATING STORAGE BATTERY CELLS.
APPLICATION FILED FEB. 8, 1918.

1,280,982.

Patented Oct. 8, 1918.
7 SHEETS—SHEET 4.

WITNESS:
Rob't R. Ketchel.

INVENTOR
Bruce Ford
BY
Augustus B. Stoughton.
ATTORNEY.

B. FORD.
VENTILATING STORAGE BATTERY CELLS.
APPLICATION FILED FEB. 8, 1918.

1,280,982.

Patented Oct. 8, 1918.
7 SHEETS—SHEET 5.

WITNESS:
Rob.T.R.Kitchel.

INVENTOR
Bruce Ford
BY
Augustus B. Stoughton
ATTORNEY.

B. FORD.
VENTILATING STORAGE BATTERY CELLS.
APPLICATION FILED FEB. 8, 1918.

1,280,982.

Patented Oct. 8, 1918.
7 SHEETS—SHEET 6.

WITNESS
Rob't R Kitchel

INVENTOR
Bruce Ford
BY
Augustus B Stoughton
ATTORNEY.

B. FORD.
VENTILATING STORAGE BATTERY CELLS.
APPLICATION FILED FEB. 8, 1918.

1,280,982.

Patented Oct. 8, 1918.
7 SHEETS—SHEET 7.

WITNESS:
Robt R Kitchel.

INVENTOR
Bruce Ford
BY
Augustus B. Stoughton
ATTORNEY.

UNITED STATES PATENT OFFICE.

BRUCE FORD, OF PHILADELPHIA, PENNSYLVANIA.

VENTILATING STORAGE-BATTERY CELLS.

1,280,982.  Specification of Letters Patent.  Patented Oct. 8, 1918.

Application filed February 8, 1918.  Serial No. 215,985.

*To all whom it may concern:*

Be it known that I, BRUCE FORD, a citizen of the United States, and a resident of Philadelphia, in the county of Philadelphia and State of Pennsylvania, have invented certain new and useful Improvements in Ventilating Storage-Battery Cells, of which the following is a specification.

The principal object of the present invention is to provide for insuring proper ventilation of storage battery cells, more particularly submarine cells.

The invention will be claimed at the end hereof, but will be first described in connection with the embodiments of it chosen for the sake of illustration in the accompanying drawings, in which—

Figure 1, is a top view of a cover embodying features of the invention.

Fig. 2, is a transverse sectional view of the same.

Fig. 3, is a sectional view of the cover shown in Figs. 1 and 2, with a filling and ventilation fitting in place.

Fig. 4, is a section on the line 4—4 of Fig. 3.

Fig. 5, is a side view of the fitting detached from the cover.

Fig. 9, is a view, similar to Fig. 6, illustrating another modification.

Fig. 10, is a section on the line 10—10 of Fig. 11, looking in the direction of the arrows.

Fig. 11, is a section on the line 11—11 of Fig. 9.

Figure 6:
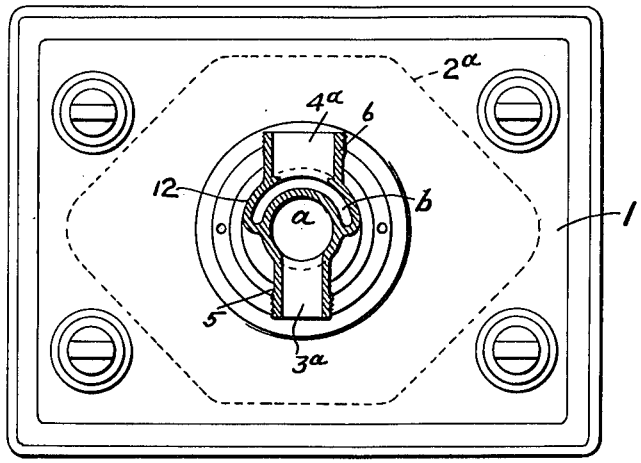
Fig. 6, is a top view of a cover, showing a fitting in section, and illustrating a modification of the invention.
Figure 7:
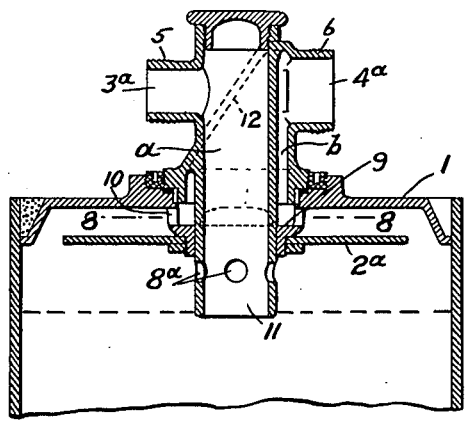
Fig. 7, is a vertical elevation of the device shown in Fig. 6.
Figure 8:
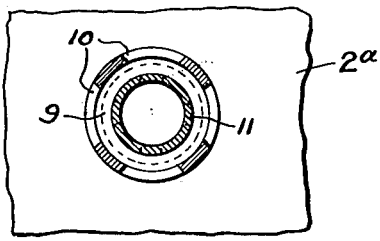
Fig. 8, is a section on the line 8—8 of Fig. 7.
Figure 12:
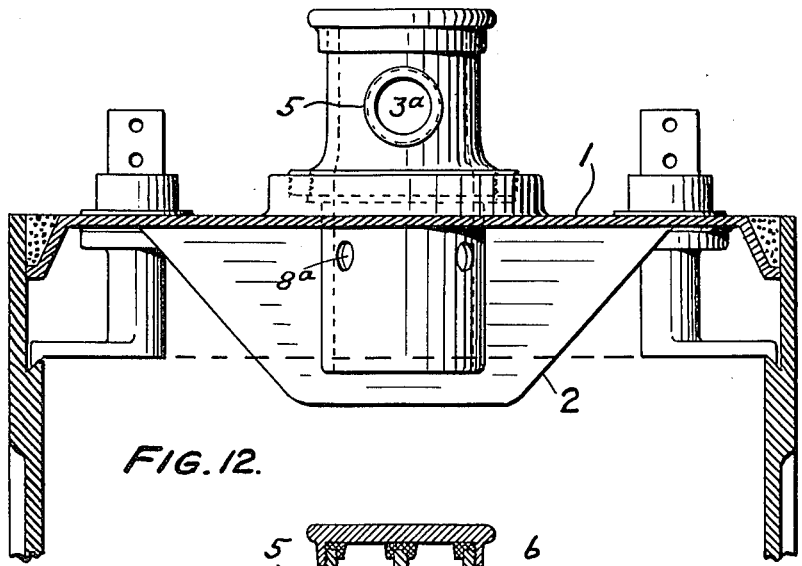
Figs. 12 and 13, are sectional views taken at right angles to each other and illustrating a modification of the invention.
Figure 13:
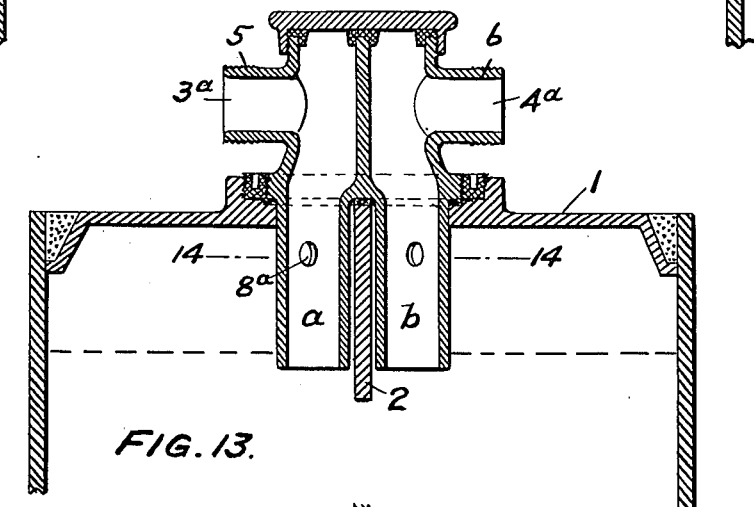
Figure 14:
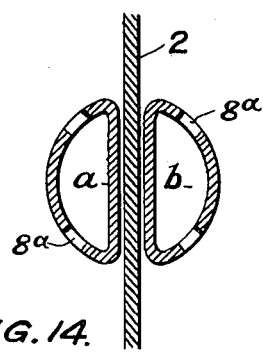
Fig. 14, is a section on the line 14—14 of Fig. 13.
Figure 15:
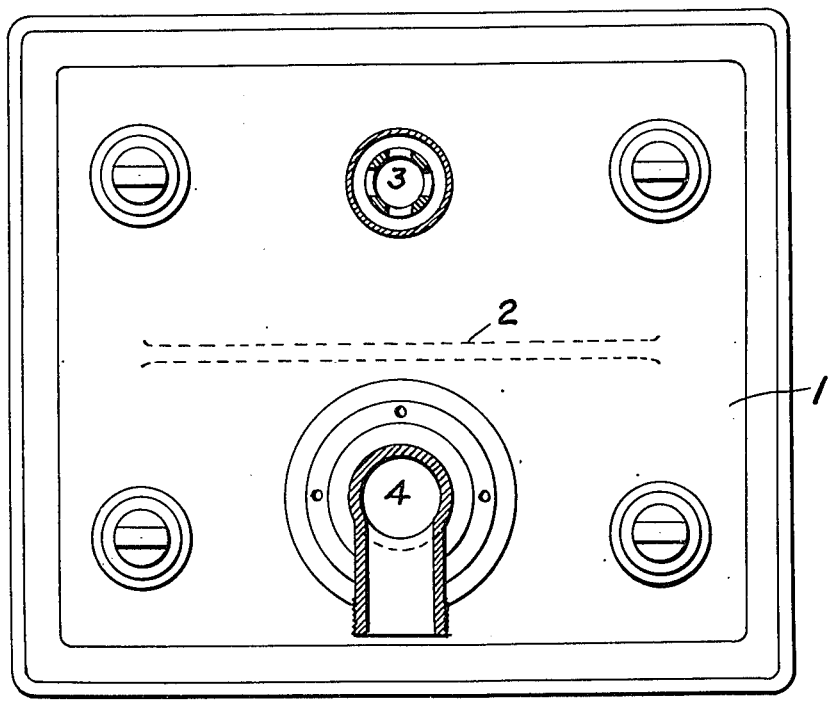
Fig. 15, is a top view, partly in section, illustrating another modification of the invention and taken on the line 15—15 of Fig. 16.
Figure 16:
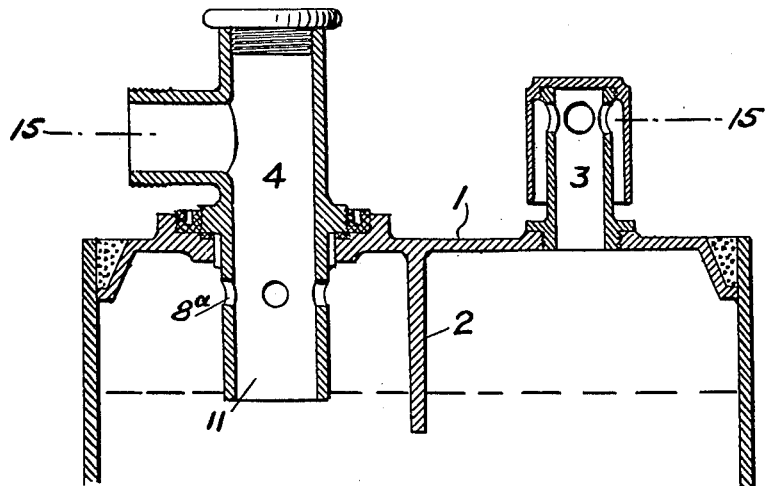
Fig. 16, is a transverse sectional view of Fig. 15.
Figure 17:
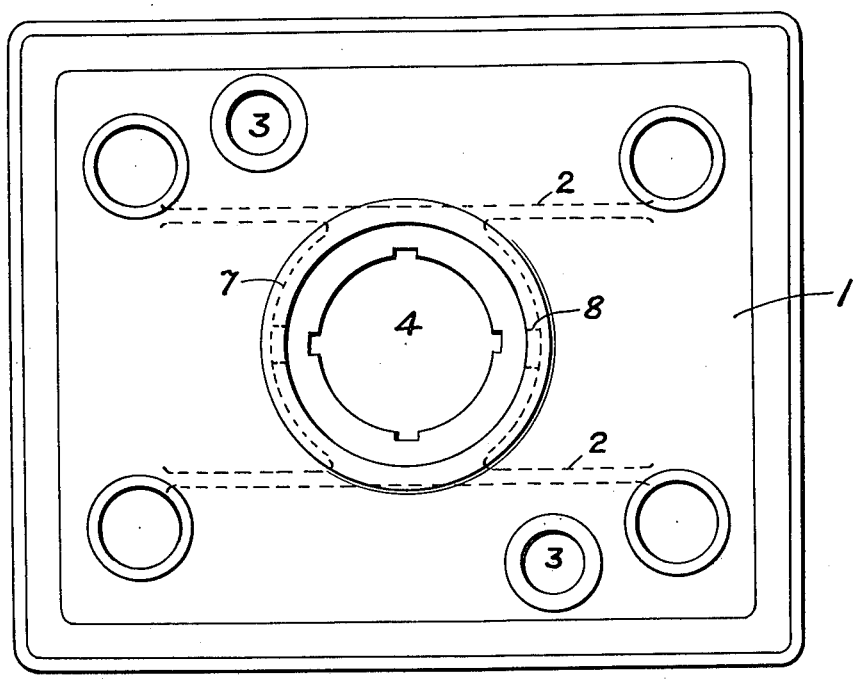
Figs. 17 and 18, are respectively a top view and a section of a cover embodying another modification of the invention.
Figure 18:
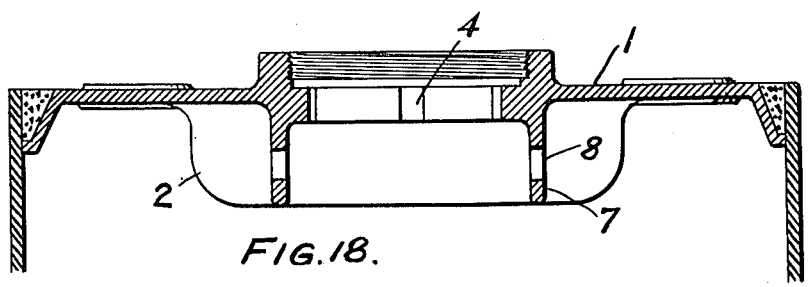
Figure 19:
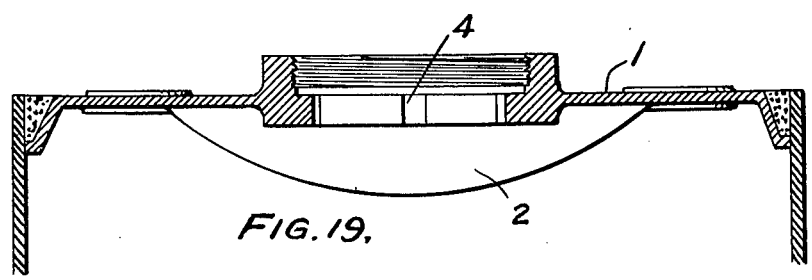
Fig. 19, is a sectional view embodying still another modification of the invention.
Figure 20:
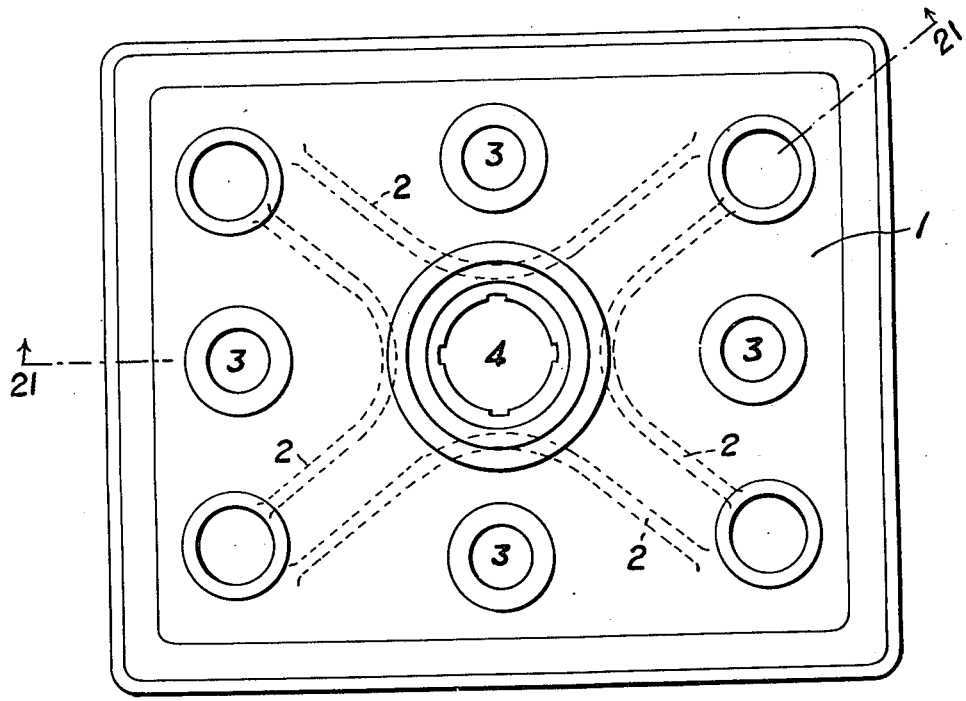
Fig. 20, is a top plan view illustrating another modification.
Figure 21:
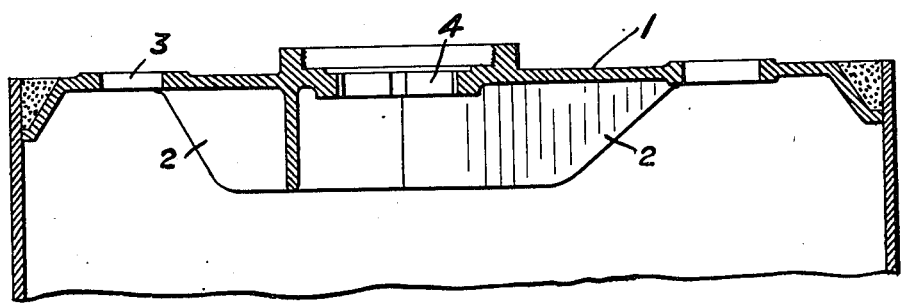
Fig. 21, is a section on the line 21—21 of Fig. 20.

In the drawings 1, is the cover below the under face of which is arranged a baffle plate or plates 2. In all the figures, except Figs. 6, 7, and 8, the baffle plate or plates are vertical, *i. e.* at right angles with the cover. In Figs. 6, 7, and 8, the baffle plate is indicated at $2^a$, and it is parallel with the cover or horizontal. In each of the figures there are ventilating inlet and outlet passages respectively communicating with the spaces on opposite sides of the baffle 2 or $2^a$ and with the exterior of the cell. The inlet and outlet passages are indicated in the construction in Figs. 15 to 21, at 3 and 4, and in the other figures they are the openings $3^a$ and $4^a$, which extend through the unions or couplings 5 and 6 extending in opposed directions from the filling and ventilating fitting which extends through the cover. As shown in Figs. 17 and 18, there is a flange 7 depending from the cover and encircling the opening 4 and merging into the baffles 2. This arrangement serves to insure good ventilation by prolonging the travel of the ventilating fluid or air. The flange is shown as provided with opening 8. In Figs. 20 and 21, the vertical baffle plates 2, are arranged in pairs and the passage 4 communicates with the space between the pairs, and the passage 3 communicates with the space outside of the pairs. The baffles 2 extend approximately to the level of the electrolyte, when the latter is at its high level, and in that connection the openings 8 are useful but when the electrolyte is at a lower level, the openings 8 are not important. In the other figures similar provision is made by providing openings $8^a$ in the filling and ventilating fitting.

In Figs. 1 to 16, the openings $3^a$ and $4^a$ respectively communicate with separate open ended passages in the fitting and these passages are indicated in Figs. 1 to 14 at *a* and *b*.

In Figs. 1 to 11, the cover is provided with a floor 9, and in the construction shown in Figs. 9 to 11, the floor merges into a swell or bulge $9^a$ in the baffle plate 2. Above this floor are ports 10 and through the floor is a second and similar filling hole. The fitting is provided with an inner tube 11, filling the hole last referred to, and vented below the floor. The fitting is also provided with a shell 12 closing the larger filling hole in the cover and communicating with the ports 10. As shown in Figs. 1 to 5, the floor 9 is arranged between the pair of ribs or baffles 2 and is connected with them.

In use the path of the ventilating fluid or air is protracted by the baffles and in this way good ventilation is insured. In connection with Figs. 1 to 14, an additional advantage is provided in that ventilating tubes or pipes may be connected to either the inlet or outlet, or both, of the filling and ventilating fitting.

The described fitting is not claimed herein other than as showing examples of arrangements of air inlet and outlet passages in connection with one or more baffle plates, but the fitting shown in Figs. 1 to 11, is made the subject-matter of my application serially numbered 215,986, filed February 8th, 1918.

What I claim is:

1. Improvements in ventilating storage battery cells comprising the combination of a cover, a baffle-plate arranged below the under face of the cover, and ventilating inlet and outlet passages respectively communicating with the spaces on opposite sides of the baffle-plate and with the exterior of the cell.

2. Improvements in ventilating storage battery cells comprising the combination of a horizontal cover, a vertical baffle-plate depending from the cover, and ventilating inlet and outlet passages respectively communicating with the spaces on opposite sides of the baffle plate and with the exterior of the cell.

3. Improvements in ventilating storage battery cells comprising the combination of a horizontal cover, a pair of vertical baffle-plates depending from the cover, and passages communicating with the exterior of the cell and of which one communicates with the space between the baffle-plates and of which the other communicates with the space outside of the pair of baffle-plates.

BRUCE FORD.